United States Patent
Burns et al.

(10) Patent No.: US 9,765,919 B2
(45) Date of Patent: Sep. 19, 2017

(54) RESILIENT FOOT

(75) Inventors: Martin P. Burns, Forked River, NJ (US); Stanley Szprengiel, Jackson, NJ (US)

(73) Assignee: Component Hardware Group, Inc., Lakewood, NJ (US)

( * ) Notice: Subject to any disclaimer, the term of this patent is extended or adjusted under 35 U.S.C. 154(b) by 1379 days.

(21) Appl. No.: 13/066,579

(22) Filed: Apr. 18, 2011

(65) Prior Publication Data

US 2012/0097828 A1 Apr. 26, 2012

Related U.S. Application Data

(63) Continuation-in-part of application No. 12/925,444, filed on Oct. 21, 2010, now abandoned.

(51) Int. Cl.
*F16M 7/00* (2006.01)

(52) U.S. Cl.
CPC ..................... *F16M 7/00* (2013.01)

(58) Field of Classification Search
CPC ................ F16M 7/00; F16M 11/00
USPC .......... 248/188.2, 188.4, 188.5, 615; 135/82, 135/86, 77; 52/126.5, 126.6, 126.7
See application file for complete search history.

(56) References Cited

U.S. PATENT DOCUMENTS

| | | | | |
|---|---|---|---|---|
| 679,468 A | * | 7/1901 | Pratt | 135/84 |
| 2,739,774 A | * | 3/1956 | Crede | 248/616 |
| 2,890,545 A | * | 6/1959 | Fiddler | 248/188.4 |
| 5,771,990 A | * | 6/1998 | Liang | 181/208 |
| 6,138,699 A | * | 10/2000 | Su | 135/82 |
| 6,138,979 A | * | 10/2000 | Morman | 248/638 |
| 6,374,841 B1 | * | 4/2002 | Yamamoto et al. | 135/77 |

* cited by examiner

*Primary Examiner* — Amy Sterling
(74) *Attorney, Agent, or Firm* — Francis C. Hand; Carella, Byrne, et al.

(57) ABSTRACT

The resilient foot has a rubber tubular member to provide a resilient support and an insert of solid material within the tubular member to limit the travel of the resilient foot under load. The insert is disposed in a bore of the tubular member and is inwardly spaced a small distance from the support surface of the tubular member to limit the vertical motion. The resilient foot has an enlarged elastomeric flange to provide non-slip characteristics and radial grooves are provided in the flange for the squeezing out of fluid between the foot and a mounting surface.

10 Claims, 4 Drawing Sheets

RESILIENT FOOT

This application is a Continuation-in-Part of application Ser. No. 12/925,444, filed Oct. 21, 2010 now abandoned.

This invention relates to a resilient foot. More particularly, this invention relates to a resilient foot for a support leg.

As is known, many devices require some resilience in their mounting whether for vibration absorption or for maintaining the device level on a mounting surface. In many instances, these devices are provided with a resilient means, such as one or more support feet of elastomeric material, on an undersurface to support the device on the mounting surface in order to absorb vibrations and the like. However, there is a need to limit the total travel to prevent resonance, or "walking" of the device, or damage or permanent deformation to the resilient means.

Accordingly, it is an object of the invention to limit the total travel of a resilient foot for a device.

It is another object of the invention to limit the total travel of a resilient foot at minimal cost and without complicated construction.

It is another object of the invention to provide a resilient foot for a device that has non-slip characteristics.

Briefly, the invention provides a resilient foot to be mounted on a vertically disposed leg for a piece of equipment in order to damp vibrations between the piece of equipment and a horizontal mounting surface on which the equipment is mounted and which is characterized in being able to limit the total travel of the foot in use.

In accordance with the invention, the resilient foot has a tubular member having a surface for resting on the horizontal mounting surface, a bore that extends from the surface of the foot and being of a predetermined resiliency to be resiliently compressible under a load placed on the leg to absorb vibrations between the leg and the horizontal mounting surface, and an insert or core disposed within the bore and having a terminal end inwardly spaced from the surface of the tubular member and being of a resiliency less than the tubular member to limit the total compression of the tubular member under the load.

In one embodiment, the resilient foot is comprised of a tubular member of elastomeric material, for example of rubber, and in particular a rubber with a Durometer of 50 Shore A while the insert is of solid material, such as of metal, and in particular of brass. In addition, the tubular member has a flange for resting on a horizontal mounting surface that has a proportionally larger footprint than the terminal end of the insert in order to provide a sufficient elastomeric surface in contact with the mounting surface to prevent slipping of the piece of equipment with respect to the mounting surface. Where the tubular member has a cylindrical shape, the flange of the tubular member is also made of circular shape. However, the flange may be of any other suitable shape, such as rectangular.

The flange of the tubular member may also have a series of radial grooves molded into a bottom surface or face of the tubular member to permit any liquid that may become trapped between the flange and the mounting surface to be squeezed out by the weight of the piece of equipment, thereby increasing contact, and thus friction, between the flange of the resilient foot and the mounting surface.

In further accordance with the invention, the insert has a roughened exterior surface, for example, provided by striations or knurling, for frictionally engaging within the bore of the tubular member. In addition, the roughened exterior surface of the insert is spaced from the support surface of the tubular member a distance sufficient to permit vertical movement of the terminal end of the insert into co-planar relation with support surface of the tubular member under vibration loadings. That is to say, this distance is sufficient to allow some vertical motion of the insert before the insert contacts the mounting surface but small enough to limit this motion so as to prevent resonance, or "walking" of the device, or damage or permanent deformation to the resilient foot.

In order to mount the resilient foot on a leg of the device being supported, the insert has an internally threaded bore extending from an end opposite the terminal end and the leg has an externally threaded stud threaded into the bore of the insert. This type of mounting also allows height adjustments to be made.

These and other objects and advantages of the invention will become more apparent from the following detailed description taken inn conjunction with the accompanying drawings wherein.

Figure 1:
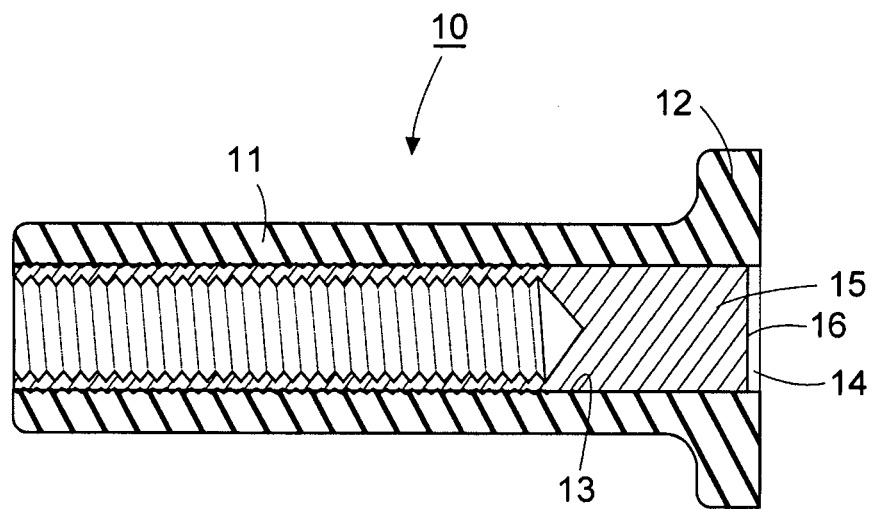
FIG. 1 illustrates a cross-sectional view of a resilient foot constructed in accordance with the invention.
Figure 2:
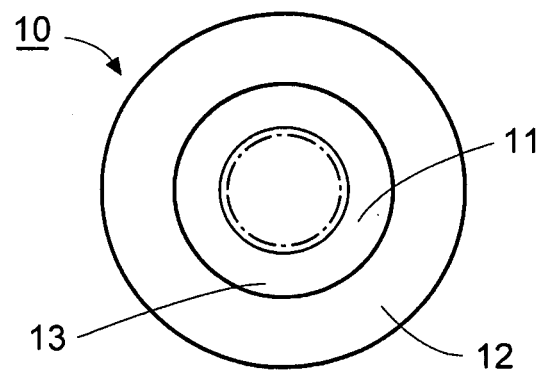
FIG. 2 illustrates a left-hand end view of the resilient foot of FIG. 1.

Referring to FIGS. 1 and 2, the resilient foot 10 includes a tubular member 11 of cylindrical shape with a flange 12 of circular shape at the terminal end and a bore 13 that extends into and through the entire length of the tubular member 11, i.e. the bore 13 extends from the terminal end to an opposite end of the tubular member 11. The tubular member 11 is of elastomeric material, such as rubber, and the flange 12 has a flat support surface 14 at the terminal end of the tubular member 11.

In addition, the resilient foot 10 includes an insert or core 15 of solid material that is entirely circumferentially disposed within the bore 13 of the tubular member 11. As illustrated, the insert 15 has a terminal end 16 that is inwardly spaced from the support surface 14 of the tubular member 11 a distance to allow the tubular member 11 to compress under a longitudinally applied load before the terminal end 16 of the insert 15 comes into co-planar relation with the support surface 14 of the tubular member 12.

The bore 13 of the tubular member 11 is of cylindrical shape but may be of any other suitable cross-section, such as rectangular, to receive the core 15 therein. In this respect, the tubular member 11 is overmolded on the core 15 so that the shape of the cross-section of the core and the bore 13 of the tubular member 11 may be of any suitable shape.

Figure 3:
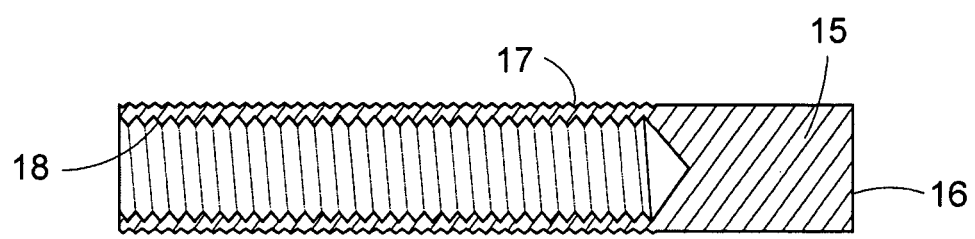
FIG. 3 illustrates a cross-sectional view of the insert of the resilient foot of FIG. 1.
Figure 4:
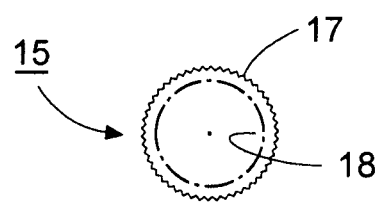
FIG. 4 illustrates a left-hand end view of the insert of FIG. 3.

Referring to FIGS. 3 and 4, the insert 15 has a roughened exterior surface 17, for example, provided by striations or knurling for frictionally engaging within the bore 13 of the tubular member 11 (not shown). As illustrated, the roughened exterior surface 17 extends along a major fractional length of the insert 15 and terminates at a point spaced from the terminal end of the insert 15. As indicated in FIG. 1, the roughened surface 17 is spaced from the support surface 14 of the tubular member 11 by a distance sufficient to permit movement of the support surface 14 of the tubular member 11 into co-planar relation with the terminal end 16 of the insert.

Referring to FIG. 3, the insert 14 has an internally threaded bore 18 extending from an end opposite to the terminal end 16 for purposes as described below.

Figure 5:
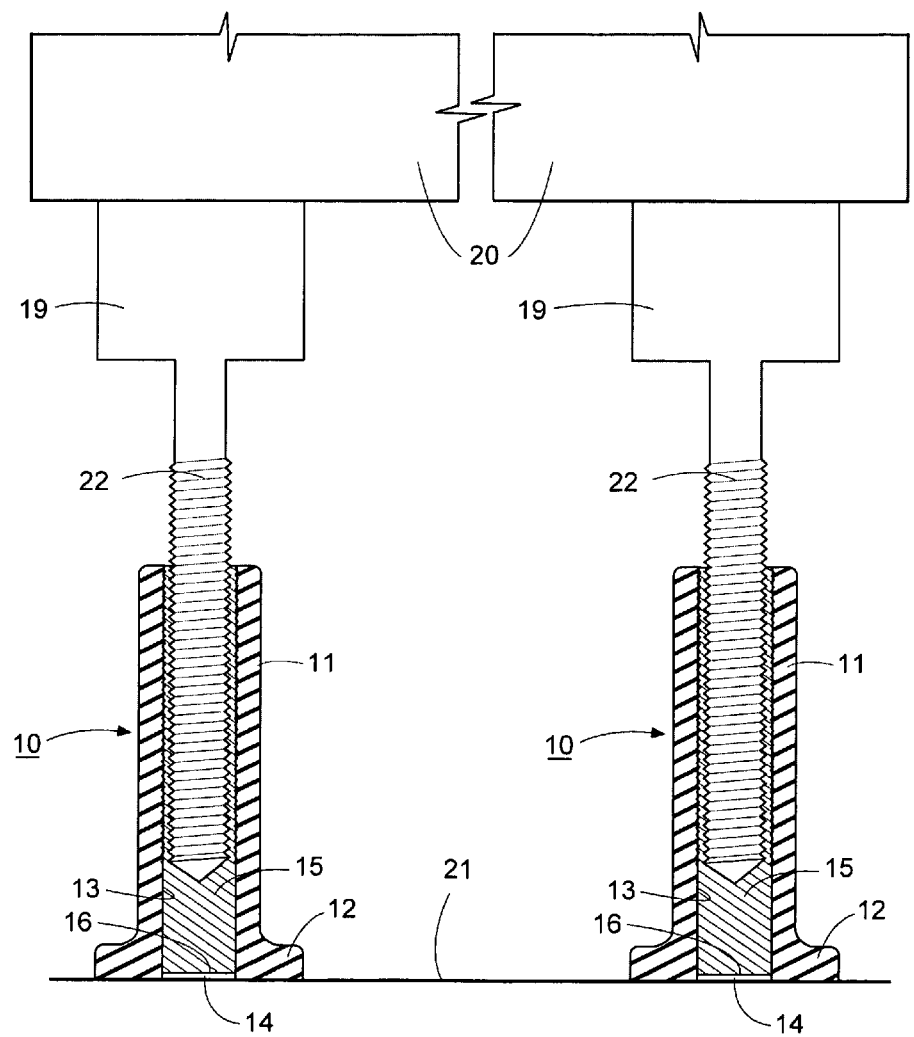
FIG. 5 illustrates a cross-sectional view of the resilient foot of FIG. 1 mounted on a support leg of a device disposed on a horizontal mounting surface.

Referring to FIG. 5, the resilient foot 10 is sized to be mounted on a depending leg 19 of a device 20 that is disposed on a horizontal mounting surface 21. The device 20 may, for example, be any suitable piece of equipment, such as, a refrigerator, deep fryer, toaster, mixer or any table top device.

As illustrated, the device 20 has a plurality of legs 19 for supporting the device 20 on the support surface 21. Each leg 19 is provided with an externally threaded stud 22 that is threaded into the bore 18 of the insert 15 of the resilient foot 10. The threading of the resilient foot 10 onto the threaded stud 22 allows the resilient foot 10 to be height adjusted so as to resiliently support the device 20 on the mounting surface 21.

By way of example, the device 20 may have four legs 19 that support the device 20 on the mounting surface 21. Each leg 19 would have a resilient foot 10 mounted thereon.

When mounted on the mounting surface 21, the device 20 is supported via the legs 19 and resilient feet 10. When the device 20 is stationary, the tubular member 11 of each foot 10 is compressed longitudinally under the weight of the device 20 as applied vertically. However, the terminal end 16 of the insert 15 within each foot 10 remains spaced above the mounting surface 21.

However, should the device 20 be subject to vibration, the tubular member 11 of each resilient foot 10 further compresses and relaxes to absorb, i.e. damp, the vibrations of the device 20 relative to the mounting surface 21. At the same time, the lower portion of the insert 15 is moved vertically relative to the tubular member 11. The spacing of the insert 15 from the mounting surface 21 is sufficient to allow some vertical motion of the insert before the insert 15 contacts the mounting surface 21. This distance is small enough to limit the vertical motion so as to prevent resonance or "walking" of the device 20 on the support surface 21 or damage or permanent deformation to the tubular member 11.

In the illustrated embodiment, the elastomeric member 11 is made of rubber having a Durometer of 50 Shore A and the insert 15 is made of a solid material, such as a metal material, for example being made of brass. Further, the tubular member 11 has a length (L) of 2.57 inches and an outer diameter (D) of 0.72 inches (i.e. a ratio of length (L) to diameter (D) greater than 3); the flange 12 that extends radially outwardly of the tubular member has a diameter of 1.26 inches and a thickness of 0.220 inches; and the insert 15 has a length of 2.530 inches, a diameter of 0.433 inches and the roughened surface 17 has a length of 1.8 inches. In this example, the terminal end 16 of the insert 15 is spaced a distance of 0.040 inches from the support surface 14 of the tubular member 11. Depending upon the size of the parts of the resilient foot 11, these dimensions may vary.

The flange 12 of the elastomeric member 11 has a proportionally larger footprint than the terminal end of the insert 15 in order to provide a sufficient elastomeric surface in contact with the mounting surface 21 to prevent slipping of the piece of equipment 20 with respect to the mounting surface 21. For example, the support surface 14 of the flange 12 has a diameter of about 3 times (1.26/0.433) the diameter of the insert 15.

Where the tubular member 11 has a cylindrical shape, the flange 12 has a circular shape. The flange 12 thus provides the resilient foot 10 with a non-slip characteristic when mounted in place.

The roughened surface 17 of the insert 15 is sufficient to permit the insert to be frictionally engaged within the tubular member 11. In this respect, the insert 15 may be placed in a mold and the elastomeric material molded over the insert 15 to form the tubular member 11.

Figure 6:
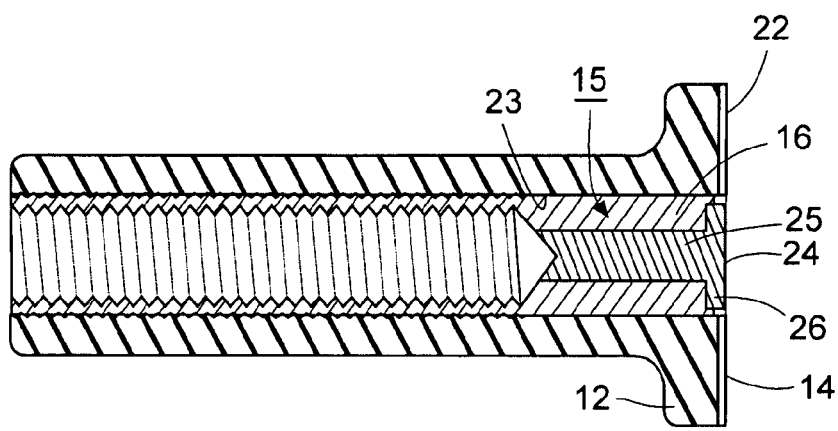
FIG. 6 illustrates a cross-sectional view of another embodiment of a resilient foot having grooves in the bottom surface of the tubular member in accordance with the invention.
Figure 7:
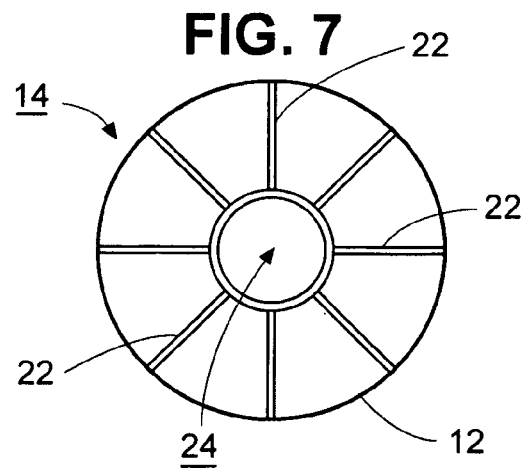
FIG. 7 illustrates a view of the bottom surface of a tubular member with grooves in accordance with the invention.

Referring to FIGS. 6 and 7, wherein like reference characters indicate like parts as above, the flange 12 of the tubular member 11 may also have a series of radial grooves 22 molded into the support surface or face 14 of the tubular member 11 to permit any liquid that may become trapped between the flange 12 and the mounting surface 21 to be squeezed out by the weight of the device 20, thereby increasing contact, and thus friction, between the flange 12 of the resilient foot 10 and the mounting surface 21.

As indicated, each groove 22 extends radially of the flange 12 and has a depth of 0.010 inches and a width of 0.020 inches. Each groove 22 is of rectangular cross-section but may be made of any suitable cross-sectional shape, such as triangular, hemispherical, or the like, and may be made to increase or decrease in cross-section towards the outer periphery.

In addition, the terminal end 16 of the insert 15 is provided with a through bore 23 that extends from the internally threaded bore 18 through the terminal end 16 so that any residual electroplating solution remaining inside the insert 15 due to electroplating of the insert 15 can flow through the bore 23 and be drained out of the insert 15 after plating.

An anti-scratch tip 24 is press fit into the bore 23 of the insert 15 after draining of the electroplating solution to close off the bore 23 and provide a contact surface. As illustrated, the tip 24 has a T-shaped cross-section defined by a circular stem 25 and a flat cap 26. The surface of the cap 26 is such as to avoid scratching of the mounting surface 21 should there be contact therebetween.

The invention thus provides a resilient foot 10 that has a tubular member 11 of a predetermined resiliency to be resiliently compressible under a load placed on the member 11 in order to absorb vibrations while the insert 15 is of a resiliency less than that of the tubular member 11 in order to limit the total compression of the tubular member 11 under load. In this regard, the insert 15 may be made of a metal material, such as brass. However, other materials may also be used to achieve a purpose of the invention. For example, the insert 15 may be made of a significantly harder elastomeric material, i.e. a plastic, than the tubular member 11 to achieve the results desired.

The invention thus provides a resilient foot that has non-slip characteristics when mounted in place and that permits trapped liquid to be squeezed out from beneath the foot by the weight of the device on which the foot is mounted.

What is claimed is:

1. A resilient foot comprising
    a tubular member of elastomeric material having a support surface at a terminal end thereof and a bore extending into said terminal end; and
    an insert of solid material disposed within said bore of said tubular member, said insert having a terminal end inwardly spaced from said support surface of said tubular member and a roughened exterior surface for frictionally engaging within said bore of said tubular member, said roughened exterior surface of said insert being spaced from said support surface of said tubular member a distance to permit movement of said support surface into co-planar relation with said terminal end of said insert.

2. A resilient foot as set forth in claim 1 wherein said insert has a diameter of 0.433 inches and is spaced from said support surface a distance of 0.040 inches.

3. A resilient foot comprising a tubular member of elastomeric material having a support surface at a terminal end thereof and a bore extending into said terminal end; and an insert of solid material disposed within said bore of said tubular member, said insert having a terminal end inwardly spaced from said support surface of said tubular member said insert having an internally threaded bore and a through bore extending from said internally threaded bore through said terminal end and further comprising an anti-scratch tip disposed in said through bore.

4. The combination of a vertically disposed leg for a piece of equipment; and a resilient foot mounted on said leg for resiliently supporting said leg on a horizontal mounting surface, said foot having a tubular member of elastomeric material having a surface for resting on the horizontal mounting surface and a bore extending from said surface of said foot, and an insert of a resiliency less than said tubular member disposed within said bore and having a terminal end inwardly spaced from said surface of said tubular member;

wherein said insert has a roughened exterior surface for frictionally engaging within said bore of said tubular member and being spaced from said surface of said tubular member a distance to permit movement of said surface of said tubular member into co-planar relation with said terminal end of said insert.

5. The combination of a vertically disposed leg for a piece of equipment; and a resilient foot mounted on said leg for resiliently supporting said leg on a horizontal mounting surface, said foot having a tubular member of elastomeric material having a surface for resting on the horizontal mounting surface and a bore extending from said surface of said foot, and an insert of a resiliency less than said tubular member disposed within said bore and having a terminal end inwardly spaced from said surface of said tubular member; said insert having an internally threaded bore extending from an end opposite said terminal end and said leg has an externally threaded stud threaded into said bore of said insert.

6. The combination of a vertically disposed leg for a piece of equipment; and a resilient foot mounted on said leg for resiliently supporting said leg on a horizontal surface, said foot having a tubular member having a surface for resting on the horizontal surface, a bore extending from said surface of said foot and being of a predetermined resiliency to be resiliently compressible under a load placed on said leg to absorb vibrations between said leg and the horizontal surface, and an insert disposed within said bore and having a terminal end inwardly spaced from said surface of said tubular member and being of a resiliency less than said tubular member to limit the total compression of said tubular member under said load said insert having an internally threaded bore extending from an end opposite said terminal end and said leg has an externally threaded stud threaded into said bore of said insert.

7. A resilient foot comprising a tubular member of elastomeric material having a support surface at a terminal end thereof and a bore extending into said terminal end; and an insert of solid material disposed within said bore of said tubular member, said insert having a terminal end inwardly spaced from said support surface of said tubular member said tubular member being of cylindrical shape with a flange of circular shape at said terminal end to form said support surface and said insert has an internally threaded bore.

8. The combination of a vertically disposed leg for a piece of equipment; and a resilient foot mounted on said leg for resiliently supporting said leg on a horizontal mounting surface, said foot having a tubular member of elastomeric material having a surface for resting on the horizontal mounting surface and a bore extending from said surface of said foot, and an insert of a resiliency less than said tubular member disposed within said bore and having a terminal end inwardly spaced from said surface of said tubular member; said tubular member being of cylindrical shape with a flange of circular shape at a terminal end to form said surface and said insert has an internally threaded bore threadably receiving said leg.

9. A resilient foot comprising a tubular member of elastomeric material having a support surface at a terminal end thereof and a bore extending into said terminal end; and an insert of solid material disposed within said bore of said tubular member, said insert having a terminal end inwardly spaced from said support surface of said tubular member said tubular member being is of cylindrical shape having a ratio of length (L) to diameter (D) greater than 3.

10. A resilient foot as set forth in claim 9 wherein said tubular member has a flange at a terminal end thereof extending radially outwardly of said tubular member.

* * * * *